(12) United States Patent
Suzuki

(10) Patent No.: US 8,798,097 B2
(45) Date of Patent: Aug. 5, 2014

(54) COMMUNICATION DEVICES THAT COMMUNICATE USING FRAMES AND COMPUTER-READABLE MEDIA FOR CONTROLLING COMMUNICATION DEVICES

(75) Inventor: Takanobu Suzuki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 168 days.

(21) Appl. No.: 13/410,984

(22) Filed: Mar. 2, 2012

(65) Prior Publication Data

US 2012/0250703 A1 Oct. 4, 2012

(30) Foreign Application Priority Data

Mar. 28, 2011 (JP) ................................. 2011-070491

(51) Int. Cl.
*H04L 29/08* (2006.01)
(52) U.S. Cl.
USPC ............................ 370/474; 370/249; 709/236
(58) Field of Classification Search
USPC ........................... 370/474, 249; 709/236, 247
See application file for complete search history.

(56) References Cited

U.S. PATENT DOCUMENTS 6,757,255 B1 * 6/2004 Aoki et al. ..................... 370/252
2007/0076618 A1 * 4/2007 Hirose ........................... 370/249

FOREIGN PATENT DOCUMENTS

JP 2007-082126 A 3/2007

* cited by examiner

*Primary Examiner* — Dang Ton
*Assistant Examiner* — Mewale Ambaye
(74) *Attorney, Agent, or Firm* — Baker Botts L.L.P.

(57) ABSTRACT

A communication device may include a reference maximum segment size ("MSS") value acquisition device, a data length acquisition device, and a transmission device. The reference MSS value acquisition device may acquire a reference MSS value from a first device by executing a transmission control protocol communication with the first device. The data length acquisition device may acquire a data length value comprised in a user datagram protocol ("UDP") header of a frame received by executing a UDP communication with the first device. The transmission device may generate a transmission frame and may transmit the transmission frame to a second device when executing a UDP communication with the second device. The reference MSS value may be an MSS of the first device. A size of the transmission frame may be based on a specific value determined utilizing the reference MSS value of the first device or utilizing the data length value.

17 Claims, 9 Drawing Sheets

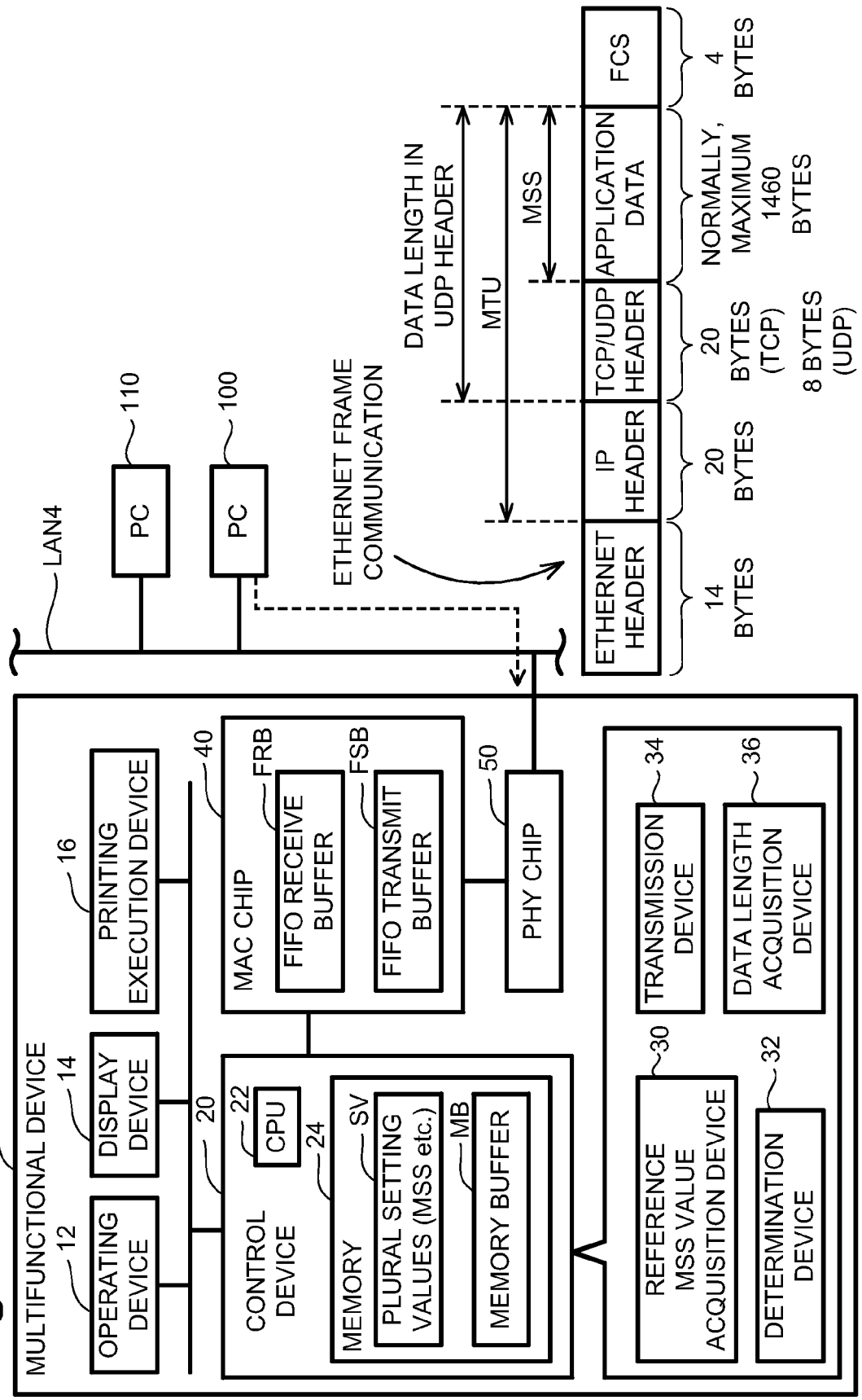

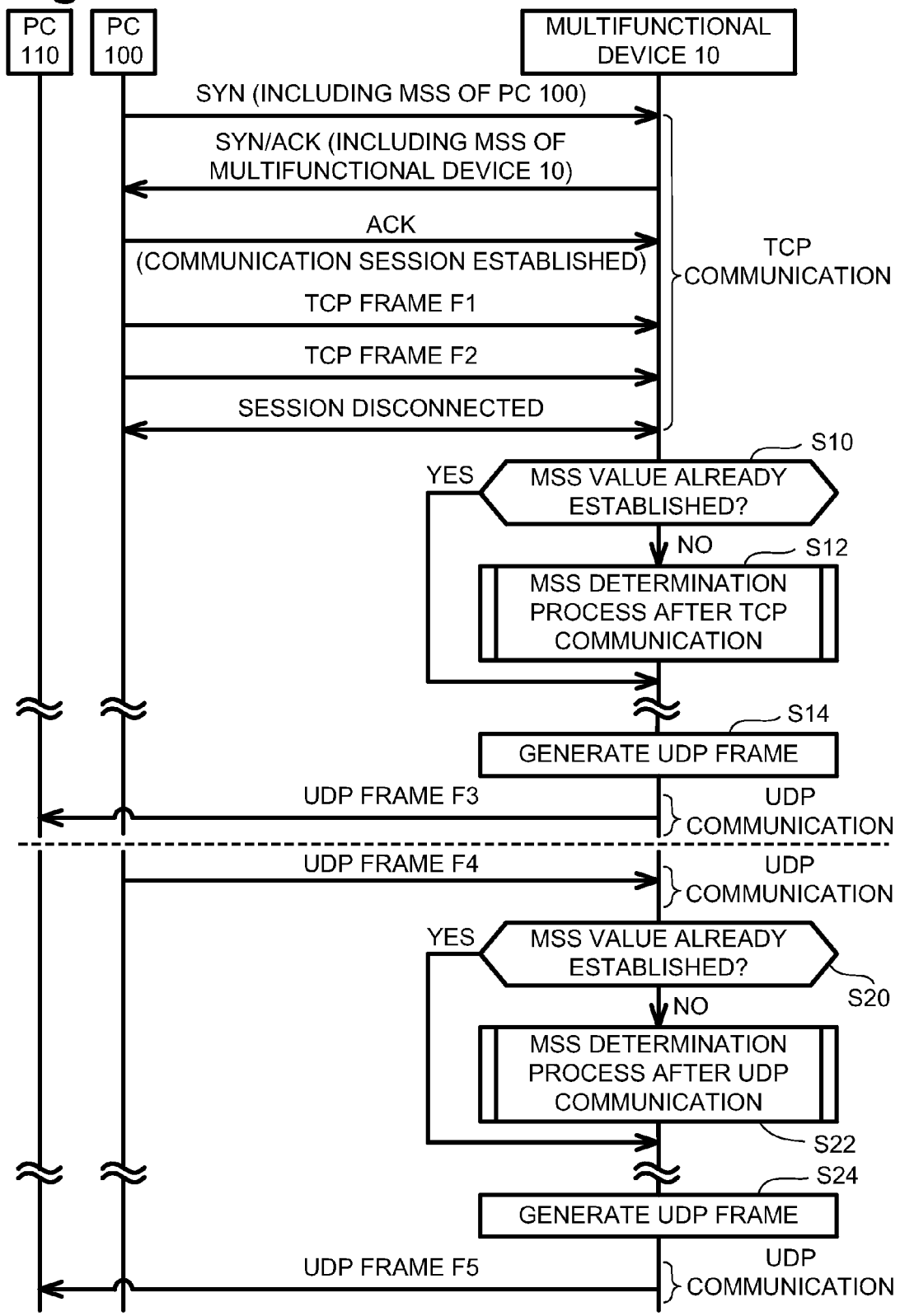

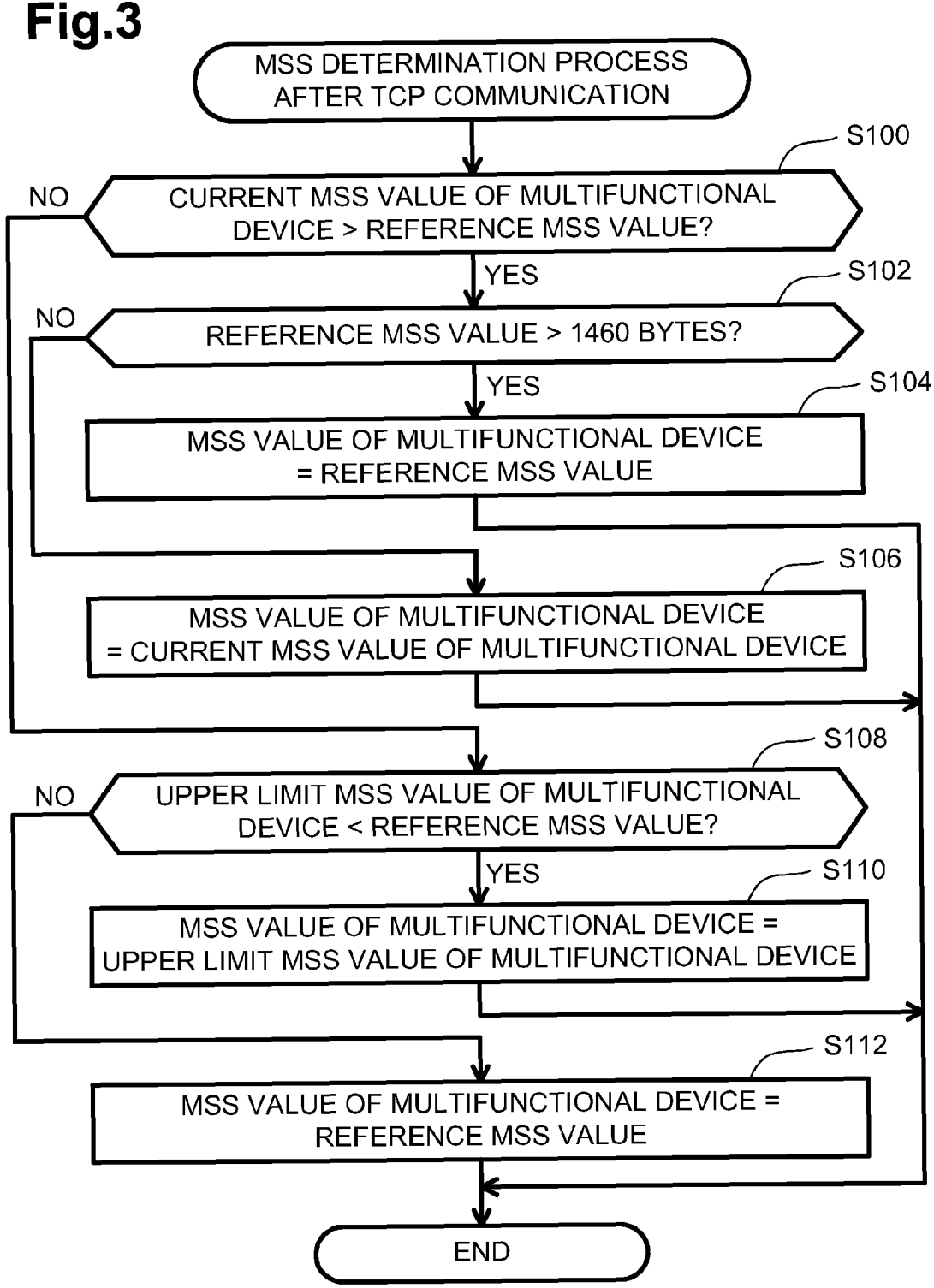

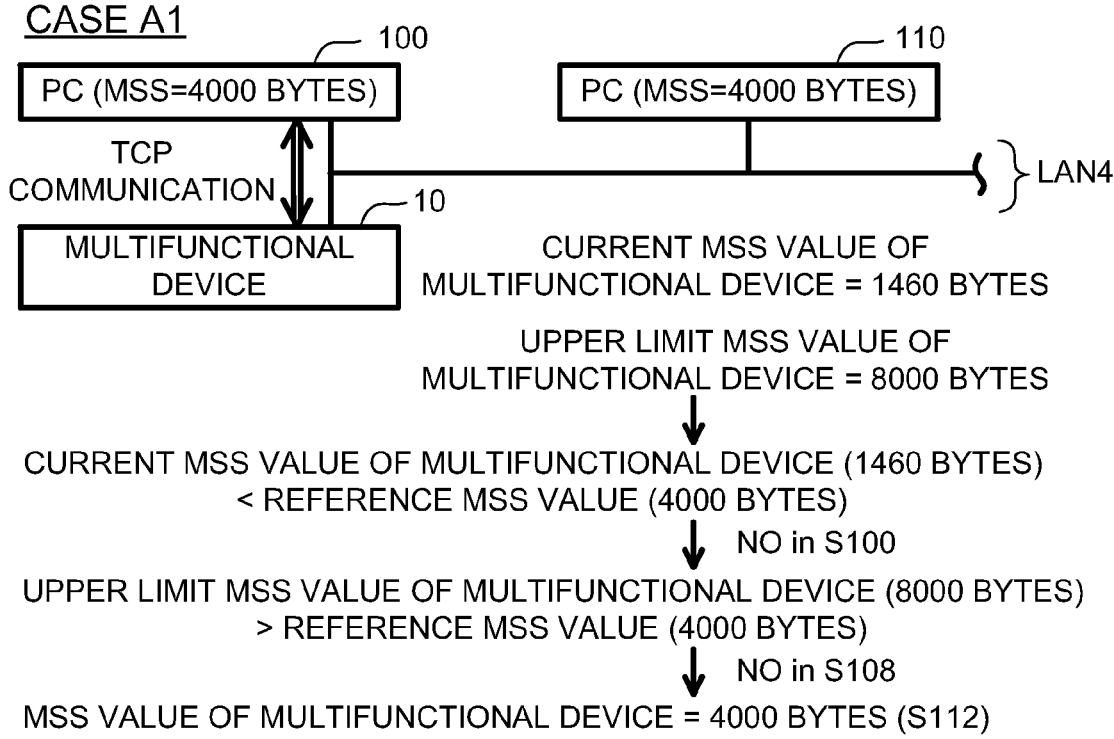
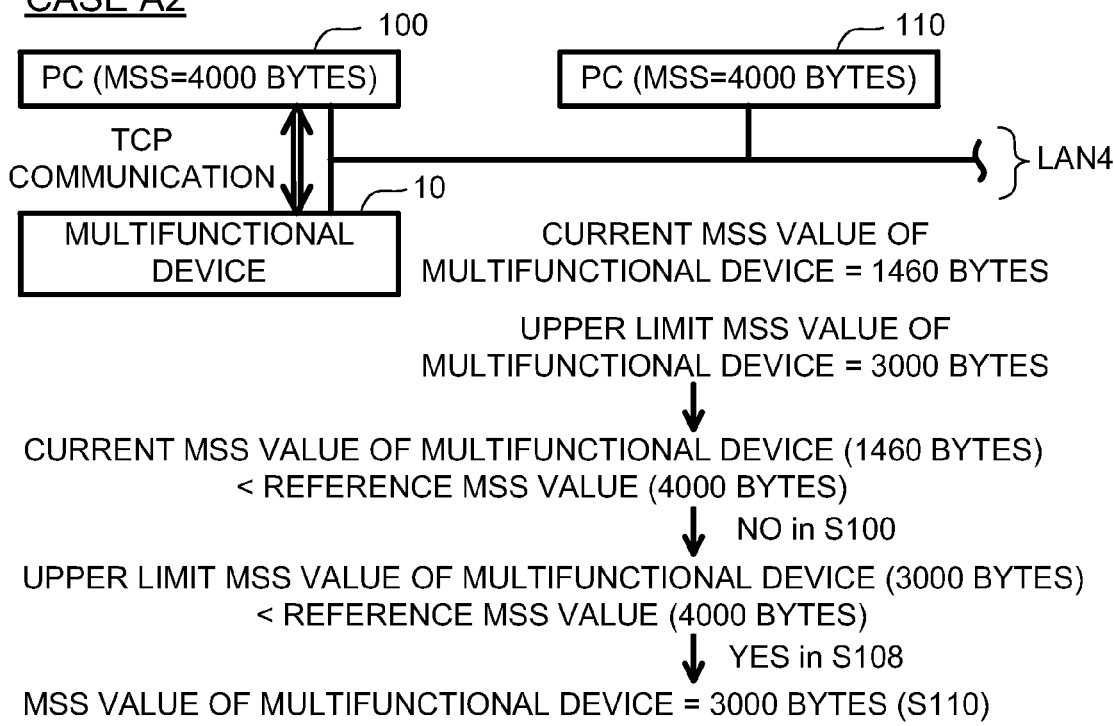

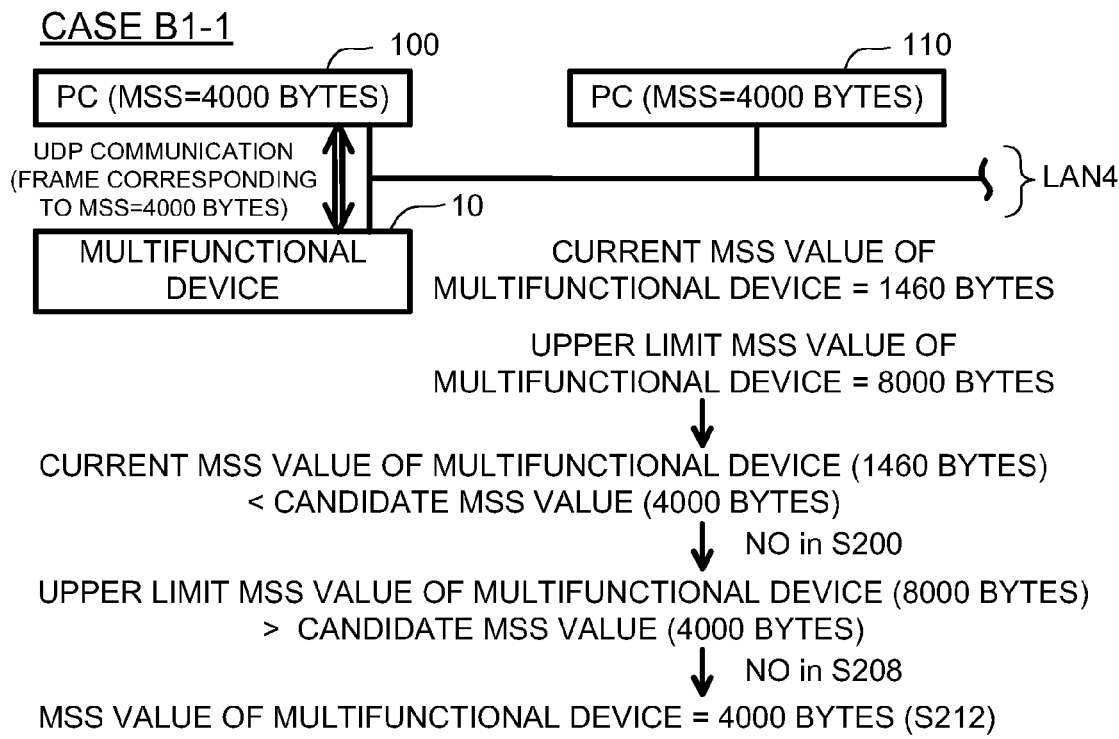
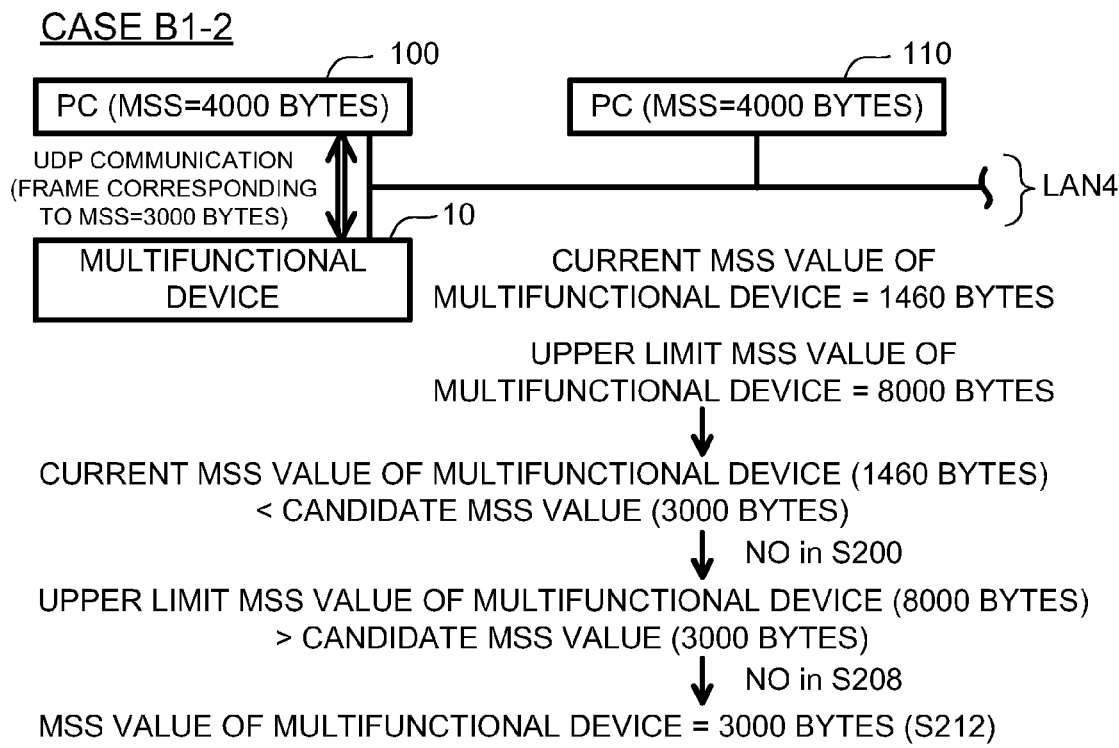

COMMUNICATION DEVICES THAT COMMUNICATE USING FRAMES AND COMPUTER-READABLE MEDIA FOR CONTROLLING COMMUNICATION DEVICES

CROSS-REFERENCE TO RELATED APPLICATION

This application claims priority from Japanese Patent Application No. 2011-070491, filed on Mar. 28, 2011, which is incorporated herein by reference.

BACKGROUND OF THE DISCLOSURE

1. Field of the Invention

The invention relates generally to communication devices to be connected to a network that is connected to a plurality of devices. In particular, the invention relates to communication devices that communicate using frames and computer-readable media carrying instructions for controlling communication devices.

2. Description of Related Art

The Ethernet protocol is known. In a known Ethernet network, communication devices connected to the Ethernet network communicate using data packets known as Ethernet frames. The communication devices communicate using frames having a predetermined frame size (i.e., 1518 bytes). In recent years, however, communication devices connected to another known Ethernet network communicate using jumbo frames which have a frame size greater than the above-described predetermined frame size.

SUMMARY OF THE INVENTION

In the above-described Ethernet network, for example, when a communication device initially connects to a network configured to permit communication using jumbo frames, it is desirable that the communication device also transmits data to an external device utilizing a jumbo frame in order to increase communication efficiency. Thus, it is desirable that the communication device transmits an appropriate frame in accordance with the network.

A communication device disclosed herein may transmit an appropriate frame in accordance with an existing network when the communication device connects to the network.

A communication device disclosed herein may comprise a processor and a memory. The memory may be configured to store computer-readable instructions therein. The computer-readable instructions may instruct the processor to operate as a reference maximum segment size ("MSS") value acquisition device and a transmission device. The reference MSS value acquisition device may be configured to acquire a reference MSS value from a first device by executing a transmission control protocol communication with the first device. The transmission device may be configured to generate a transmission frame and to transmit the transmission frame to a second device when executing a user datagram protocol ("UDP") communication with the second device. The reference MSS value may be a value of an MSS of the first device. A size of the transmission frame may be based on a specific value determined utilizing the reference MSS value of the first device.

Another communication device disclosed herein may comprise a processor and a memory. The memory may be configured to store computer-readable instructions therein. The computer-readable instructions may instruct the processor to operate as a data length acquisition device and a transmission device. The data length acquisition device may be configured to acquire a data length value comprised in a UDP header of a received frame received by executing a UDP communication with a first device. The transmission device may be configured to generate a transmission frame and to transmit the transmission frame to a second device when executing a UDP communication with the second device. A size of the transmission frame may be based on a specific value determined utilizing the data length value.

Still another communication device disclosed herein may comprise a reference MSS value acquisition device and a transmitter. The reference MSS value acquisition device may be configured to acquire a reference MSS value from a first device by executing a transmission control protocol communication with the first device. The transmitter may be configured to generate a transmission frame and to transmit the transmission frame to a second device when executing a user datagram protocol communication with the second device. The reference MSS value may be a value of an MSS of the first device. A size of the transmission frame may be based on a specific value determined utilizing the reference MSS value of the first device.

Yet another communication device disclosed herein may comprise a data length acquisition device and a transmitter. The data length acquisition device may be configured to acquire a data length value comprised in a UDP header of a received frame received by executing a UDP communication with a first device. The transmitter may be configured to generate a transmission frame and to transmit the transmission frame to a second device when executing a UDP communication with the second device. A size of the transmission frame may be based on a specific value determined utilizing the data length value.

A non-transitory, computer-readable storage medium disclosed herein may comprise computer-readable instructions for a processor of a communication device. The computer-readable instructions may instruct the processor to perform a step of acquiring a reference MSS value from a first device by executing a transmission control protocol communication with the first device, wherein the reference MSS value is a value of an MSS of the first device. The computer-readable instructions may instruct the processor to perform a step of determining a size of a transmission frame based on a specific value determined utilizing the reference MSS value of the first device. The computer-readable instructions may instruct the processor to perform a step of generating the transmission frame and transmitting the transmission frame to a second device when executing a user datagram protocol communication with the second device.

Another non-transitory, computer-readable storage medium disclosed herein may comprise computer-readable instructions for a processor of a communication device. The computer-readable instructions may instruct the processor to perform a step of acquiring a data length value comprised in a UDP header of a received frame received by executing a UDP communication with a first device. The computer-readable instructions may instruct the processor to perform a step of determining a size of a transmission frame based on a specific value determined utilizing the data length value. The computer-readable instructions may instruct the processor to perform a step of generating the transmission frame and transmitting the transmission frame to a second device when executing a UDP communication with the second device.

The invention may be implemented by various embodiments. For example, the invention may be implemented as methods for controlling communication devices or as storage mediums storing computer programs for implementing functions of communication devices.

Other objects, features, and advantages will be apparent to persons of ordinary skill in the art from the following detailed description of the invention and the accompanying drawings.

BRIEF DESCRIPTION OF THE DRAWINGS

For a more complete understanding of the present invention, needs satisfied thereby, and the objects, features, and advantages thereof, reference now is made to the following descriptions taken in connection with the accompanying drawings.

FIG. 1 depicts an example of a configuration of a communication system.

FIG. 2 depicts an example of communication between a personal computer ("PC") and a printer.

FIG. 3 depicts a flowchart of a maximum segment size ("MSS") determination process after transmission control protocol ("TCP") communication.

FIG. 4A depicts an exemplary case A1 of the process of FIG. 3, and FIG. 4B depicts an exemplary case A2 of the process of FIG. 3.

FIG. 8A depicts an exemplary case B1-1 of the process of FIG. 7, and FIG. 8B depicts an exemplary case B1-2 of the process of FIG. 7.

DETAILED DESCRIPTION OF EMBODIMENTS OF THE INVENTION

System Configuration

Figure 5A:
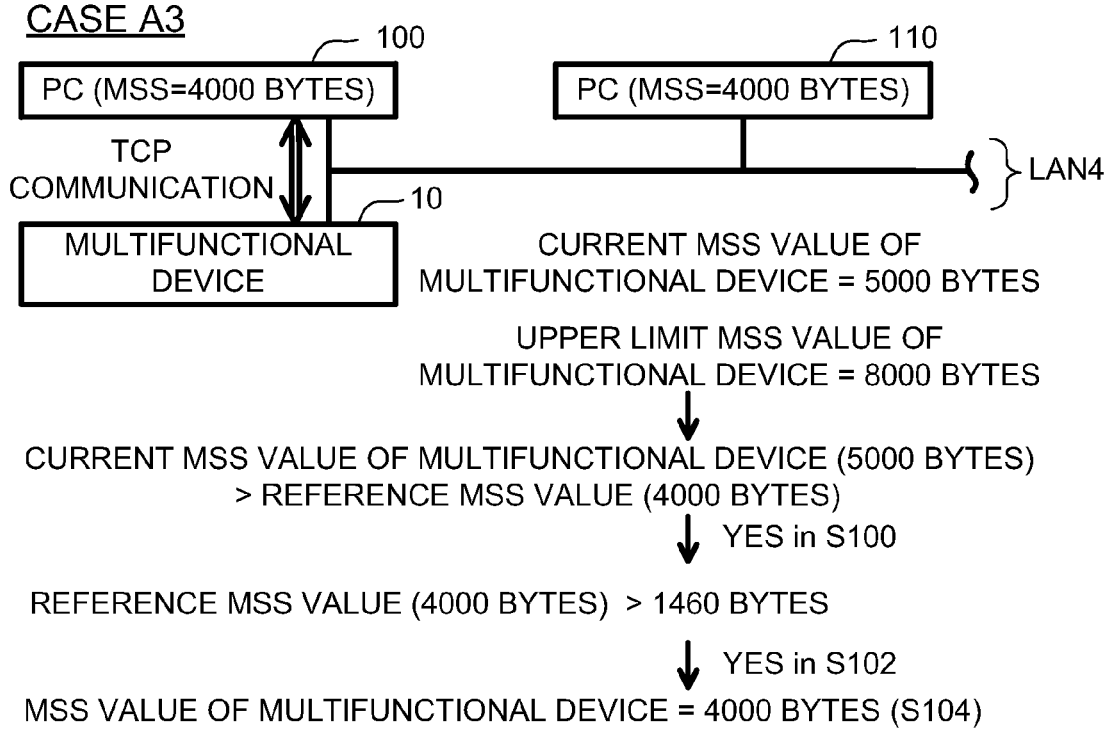
FIG. 5A depicts an exemplary case A3 of the process of FIG. 3.

As depicted in FIG. 1, a communication system 2 may comprise a multifunctional device 10 (that is, a peripheral device of personal computers ("PCs") 100 and 110) and the PCs 100 and 110. The PCs 100 and 110 may be connected to a local area network ("LAN") 4. The LAN 4 may be a network compliant with Ethernet network standards. In particular, the LAN 4 may be a gigabit Ethernet network, i.e., a network that may realize a communication speed of one gigabit per second. The gigabit Ethernet network may comprise one or more of 1000BASE-SX, 1000BASE-LX, 1000BASE-CX (each regulated by an IEEE 802.3z standard), and 1000BASE-T (regulated by an IEEE 802.3ab standard) Ethernet standards.

Configuration of Multifunctional Device 10

The multifunctional device 10 may execute a plurality of functions. The plurality of functions may comprise one or more of a printing function, a scanning function, a copying function, a facsimile function, an internet protocol ("IP") telephone function, and the like. The multifunctional device 10 may connect to the LAN 4 to which the PCs 100 and 110 are already connected. Thus, the multifunctional device 10 may be a new device joining the LAN 4.

The multifunctional device 10 may comprise an operating device 12, a display device 14, a printing execution device 16, a control device 20, a media access control ("MAC") chip 40, and a physical layer ("PHY") chip 50. The above-mentioned devices 12, 14, 16, and 20 may be connected to a bus line. The operating device 12 may comprise a plurality of keys. A user may input a variety of commands into the multifunctional device 10 by operating the operating device 12. The display device 14 may be a display for displaying various pieces of information. The printing execution device 16 may comprise a printing mechanism, such as an ink jet type printer or a laser type printer, and may execute printing in accordance with a command from the control device 20.

The multifunctional device 10 further may comprise a scanning execution device (not depicted), a facsimile execution device (not depicted), an IP telephone execution device (not depicted), and the like. For example, when preparing to transmit voice data input into a microphone of the IP telephone execution device to the PC 110, the multifunctional device 10 may communicate with the PC 110 using a user datagram protocol ("UDP"). Also, for example, when preparing to receive printing data representing an image to be printed by the printing execution device 16 from the PC 100, the multifunctional device 10 may communicate with the PC 100 using a transmission control protocol ("TCP").

The control device 20 may comprise a central processing unit ("CPU") 22 and a memory 24. The CPU 22 may execute various processes according to a program (not depicted) stored in the memory 24. When the CPU 22 executes a process according to the program, the CPU 22 may enable functions corresponding to a reference maximum segment size ("MSS") value acquisition device 30, a determination device 32, a transmission device 34, and a data length acquisition device 36.

The memory 24 may comprise a non-volatile memory, a volatile memory, and the like. The memory 24 may store various kinds of setting values SV. The setting values SV may comprise a current MSS value of the multifunctional device 10. Hereafter, the current MSS value of the multifunctional device 10 may be referred to as the "current MSS value."

Maximum Segment Size ("MSS")

Before describing the MSS, a description of an Ethernet frame is given. Ethernet data communication may be executed with a frame as a smallest communication unit. The configuration of one frame is depicted schematically in FIG. 1. A TCP frame may comprise an Ethernet header, an IP header, a TCP header, application data, and a frame check sequence ("FCS"). A UDP frame has the similar configuration to the TCP frame, except that the UDP frame may comprise a UDP header instead of the TCP header.

The Ethernet header, IP header, and FCS may have data sizes of 14 bytes, 20 bytes, and 4 bytes, respectively. The TCP header and UDP header may have data sizes of 20 bytes and 8 bytes respectively. These data sizes may be predetermined based on Ethernet standards. The data size of the application data may be determined by the communication devices (e.g., the multifunctional device 10 and PCs 100 and 110) that communicate using frames.

The MSS is the maximum allowable data size of the application data comprised in one frame. For example, in a network environment comprising 10BASE Ethernet network or 100BASE Ethernet network, rather than gigabit Ethernet network, 1518 bytes normally may be utilized as the maximum data size of one frame. Consequently, in a network environment in which 1518 bytes is utilized as the maximum data size of one frame (hereafter referred to as a "normal network environment"), a communication device normally may utilize 1460(=1518−14−20−20−4) bytes as the MSS. FIG. 1 depicts this normal network environment.

The multifunctional device 10 of the present embodiment may communicate using a frame that has a data size greater than 1518 bytes (i.e., a jumbo frame). Consequently, in a network environment utilizing a jumbo frame, the multifunctional device 10 may utilize a value greater than 1460 bytes as the current MSS value.

When shipping the multifunctional device 10, a manufacturer may set 1460 bytes as the current MSS value of the multifunctional device 10. When an MSS determination process according to Step S12 or Step S22, as depicted in FIG. 2, executes; the current MSS value stored in the memory 24 as the setting value SV may change to an MSS value (e.g., an MSS value determined during the MSS determination process of Step S12 or Step S22) greater than 1460 bytes. The MSS value determined during the MSS determination process of Step S12 or Step S22 may be less than or equal to a value (hereafter referred to as an "upper limit MSS value") obtained by subtracting 58 bytes from the storage capacity of a first-in-first-out ("FIFO") receive buffer FRB (described hereafter). Accordingly, the storage capacity of the FIFO receive buffer FRB may be greater than or equal to a value obtained by adding 58 bytes to the current MSS value of the multifunctional device 10.

Maximum Transmission Unit ("MTU")

A value obtained by adding the data size (20 bytes) of the IP header and data size (20 bytes) of the TCP header to the MSS is referred to as an MTU. An aggregate of the IP header, the TCP header (or the UDP header), and the application data is normally is referred to as an IP packet. The MTU may be the maximum allowable data size for the IP packet.

In an embodiment, the MTU value of the multifunctional device 10 may not be stored in the memory 24 as the setting value SV. The multifunctional device 10 may compute the MTU value of the multifunctional device 10 from the current MSS value, as necessary, and may execute a process utilizing the MTU value. For example, in a normal network environment, a communication device normally may utilize 1460 bytes as the MSS value, and, thus, may utilize 1500 bytes (1460 bytes+20 bytes+20 bytes) as the MTU value. The multifunctional device 10 may communicate using a jumbo frame. Consequently, in a network environment utilizing a jumbo frame, the multifunctional device 10 may utilize a value greater than 1500 bytes as the MTU value.

The memory 24 may comprise a memory buffer MB. The memory buffer MB may store an Ethernet frame (hereafter referred to as a "transmission frame") to be transmitted from the multifunctional device 10 to the LAN 4. In particular, the memory buffer MB may store a transmission frame before the transmission frame moves from the memory 24 to a FIFO transmit buffer FSB. The memory buffer MB may store an Ethernet frame (hereafter referred to as a "received frame") received from the LAN 4. In particular, the memory buffer MB may store a received frame after the received frame moves from the FIFO receive buffer FRB to the memory 24.

The MAC chip 40 may execute a process related to a media access control ("MAC") layer, which may be a sub-layer of a data link layer of the Open Systems Interconnection ("OSI") reference model. The MAC chip 40 may comprise the FIFO transmit buffer FSB and the FIFO receive buffer FRB. The FIFO transmit buffer FSB may have a storage capacity for storing at least one transmission frame. The FIFO receive buffer FRB may have a storage capacity for storing at least one received frame. The storage capacities of the two buffers FSB and FRB may be equal. Each storage capacity may be greater than 1518 bytes, which may be the maximum data size of one frame utilized on the normal Ethernet network.

The PHY chip 50 may execute a process related to a physical layer of the OSI reference model. The PHY chip 50 may connect to the LAN 4 and to the MAC chip 40. A transmission frame stored in the FIFO transmit buffer FSB may be transmitted to the LAN 4 via the PHY chip 50. A received frame received from the LAN 4 may be stored in the FIFO receive buffer FRB via the PHY chip 50.

Configuration of PCs 100 and 110

A description of the configuration of the PC 100 now is given. The PC 110 may comprise the same configuration as the PC 100. The PC 100 may comprise an operating device (not depicted), a display device (not depicted), a control device (not depicted), and the like. The PC 100 may store a printer driver for the multifunctional device 10. The PC 100 may transmit printing data to the multifunctional device 10 in accordance with the printer driver. As described above, the TCP may be utilized for communicating the printing data. When the PC 100 executes the IP telephone function, the PC 100 may receive voice data from the multifunctional device 10 and may transmit voice data input into a microphone of the PC 100 to the multifunctional device 10. The UDP may be utilized for communicating the IP telephone voice data. The PC 100 may transmit a Simple Network Management Protocol ("SNMP") request to the multifunctional device 10. The UDP may be utilized for communicating SNMP data. The MSS value of the PC itself may be set in each of the PCs 100 and 110.

TCP Communication from PC 100 to Multifunctional Device 10 of FIG. 2

After the multifunctional device 10 initially connects to the LAN 4, the user may select printing target data (i.e., printing data) by operating the operating device of the PC 100. In this case, the PC 100 may negotiate with the multifunctional device 10 to establish a TCP communication session for transmitting the printing data to the multifunctional device 10.

Specifically, the PC 100 may transmit a synchronous idle ("SYN") signal comprising the MSS value of the PC 100 to the multifunctional device 10. Hereafter, the MSS value of the PC 100 may be referred to as the "reference MSS value." The reference MSS value acquisition device 30 of the multifunctional device 10, as depicted in FIG. 1, may acquire the reference MSS value of the PC 100 by receiving the SYN signal from the PC 100.

The control device 20 of the multifunctional device 10 may acquire the current MSS value from among the setting values SV in the memory 24. The control device 20 then may notify the PC 100 of the current MSS value of the multifunctional device 10 by transmitting an SYN or an acknowledgement ("ACK") signal comprising the current MSS value to the PC 100. By so doing, the PC 100 may acquire the current MSS value of the multifunctional device 10.

The PC 100 may transmit an ACK signal to the multifunctional device 10. As a result, the multifunctional device 10 and PC 100 may establish a TCP communication session therebetween. The PC 100 then may divide the printing data into a plurality of partial printing data. The PC 100 may select the lesser value from the reference MSS value of the PC 100 and the current MSS value of the multifunctional device 10, and the PC 100 may set the selected value as the data size of one partial printing data. Consequently, when the MSS value selected by the PC 100 is large, the number of the plurality of partial printing data after division may be small. As a result, it may be possible to reduce the processing time needed for the data division in the PC 100 and the processing time needed for data coupling in the multifunctional device 10. When the MSS value is a large value, i.e., when a jumbo frame may be utilized, processing times in the multifunctional device 10 and PC 100 may be less than processing times required when utilizing a normal Ethernet frame (e.g., 1518 bytes). As a result, the data communication speed may increase.

Next, the PC 100 may generate a frame F1 comprising one partial printing data as the application data, and the PC 100 may transmit the frame F1 to the multifunctional device 10. The multifunctional device 10 may store the frame F1 in the FIFO receive buffer FRB in the MAC chip 40 via the PHY chip 50. As described above, the storage capacity of the FIFO receive buffer FRB may be greater than 1518 bytes, which may be the maximum data size of one frame utilized on the normal Ethernet, and may be greater than or equal to a value obtained by adding 58 bytes to the current MSS value of the multifunctional device 10. Consequently, when the PC 100 generates one frame based on the lesser of the reference MSS value of the PC 100 and the current MSS value of the multifunctional device 10, the data size of the frame is a value less than or equal to the storage capacity of the FIFO receive buffer FRB. Consequently, this may prevent a situation in which the data size of one frame is greater than the storage capacity of the FIFO receive buffer FRB, which would prevent the multifunctional device 10 from receiving the frame.

The control device 20 of the multifunctional device 10 may move the received frame F1 in the FIFO receive buffer FRB to the memory buffer MB. By so doing, the multifunctional device 10 may free up space in the FIFO receive buffer FRB. In a manner similar to that described with respect to the frame F1, the PC 100 may generate a frame F2 and may transmit the frame F2 to the multifunctional device 10. In a manner similar to that described with respect to the received frame F1, the control device 20 of the multifunctional device 10 may move the received frame F2 to the memory buffer MB.

After receiving the frames F1 and F2, the control device 20 of the multifunctional device 10 may execute processes sequentially in accordance with the received frames F1 and F2 in the memory buffer MB. For example, the control device 20 may execute a process (e.g., a process of transmitting a drive signal to the printing execution device 16) that may cause the printing execution device 16 to execute printing in accordance with partial printing data in the received frames F1 and F2. Upon completing the processes in accordance with the received frames F1 and F2, the control device 20 may delete the received frames F1 and F2 sequentially from the memory buffer MB, which may free up the memory buffer MB. Upon completing transmission of the printing data to the multifunctional device 10, the PC 100 may disconnect the TCP communication session.

When the PC 100 disconnects the TCP communication session, the determination device 32 of the multifunctional device 10, as depicted in FIG. 1, may determine whether or not the current MSS value of the multifunctional device 10 already is established or fixed (Step S10). A user of the multifunctional device 10 (e.g., the administrator of the LAN 4) may execute an operation for fixing the current MSS value of the multifunctional device 10 using the operation device 12 while the power supply to the multifunctional device 10 is on. In Step S10, the determination device 32 may determine whether the user has executed the above-described operation.

When the current MSS value of the multifunctional device 10 already is established (Step S10:YES), the MSS determination process of Step S12 may not be executed. On the other hand, when the current MSS value of the multifunctional device 10 is not established (Step S10:NO), the determination device 32 may execute the MSS determination process of Step S12. The MSS determination process of Step S12 may be a process for determining the MSS value to be utilized by the multifunctional device 10 in a communication executed after the TCP communication, as depicted in FIG. 2. A detailed description of the MSS determination process of Step S12 is given hereafter.

In the example of FIG. 2, the PC 100 may initiate the TCP communication. The PC 100 may transmit the SYN signal comprising the reference MSS value to the multifunctional device 10. The multifunctional device 10 then may transmit the SYN/ACK signal comprising the current MSS value to the PC 100.

In a modified example, the multifunctional device 10 may initiate the TCP communication. The multifunctional device 10 may transmit an SYN signal comprising the current MSS value to the PC 100. The PC 100 then may transmit an SYN/ACK signal comprising the reference MSS value to the multifunctional device 10. In the case of the modified example, the determination device 32 may execute the MSS determination process of Step S12 after the TCP communication in the case of "No" in Step S10.

UDP Communication after TCP Communication

After the multifunctional device 10 and PC 100 execute the above-described TCP communication therebetween (i.e., communication and negotiation utilizing the frames F1 and F2), the user may input an instruction using the operating device 12, for example. The instruction may instruct the multifunctional device 10 to execute an IP telephone communication with the PC 110. In this case, the transmission device 34, as depicted in FIG. 1, may generate a transmission frame F3 which may comprise voice data input into the microphone of the IP telephone execution device (Step S14). The transmission device 34 may transmit the transmission frame F3 to the PC 110 using UDP communication.

During the UDP communication, unlike the TCP communication, the multifunctional device 10 may not execute negotiation (e.g., communication by transmitting and receiving an SYN signal, SYN/ACK signal, or the like) with the PC 110. Consequently, the multifunctional device 10 may not know the MSS value of the PC 110. In Step S14, the transmission device 34 may acquire the current MSS value of the multifunctional device 10 from the memory 24. For example, when the multifunctional device 10 executes the MSS determination process of Step S12, the transmission device 34 may acquire the MSS value determined during the MSS determination process of Step S12. The transmission device 34 then may compute the MTU value of the multifunctional device 10 by adding 40 bytes (20 bytes+20 bytes) to the current MSS value of the multifunctional device 10. The transmission device 34 may compute the maximum data size of the application data to be comprised in the transmission frame F3 by subtracting 28 bytes (20 bytes corresponding to the IP header+8 bytes corresponding to the UDP header) from the MTU value of the multifunctional device 10. The transmission device 34 may generate the transmission frame F3 in the memory buffer MB. The transmission frame F3 may comprise application data (e.g., voice data) of a size less than or equal to the maximum data size. The transmission device 34 may move the transmission frame F3 to the FIFO transmit buffer FSB. The multifunctional device 10 may transmit the transmission frame F3 stored in the FIFO transmit buffer FSB to the PC 110 via the PHY chip 50.

The PC 110 may determine whether or not the data size of the IP packet (i.e., the aggregate of the IP header, UDP header, and application data) comprised in the frame F3 transmitted from the multifunctional device 10 is greater than the MTU value of the PC 110 (i.e., the MTU value is equal to the MMS value of the PC 110 plus 40 bytes). When the data size of the IP packet is greater than the MTU value of the PC 110, the PC 110 may disregard the frame F3 (i.e., the PC 110 may not execute any process in accordance with the frame F3). When the data size of the IP packet is less than or equal to the MTU value of the PC 110, the PC 110 may execute a process (e.g., a process for outputting voice data from a speaker of the PC 110) in accordance with the frame F3.

MSS Determination Process after TCP Communication of FIG. 3

Referring to FIG. 3, a description of the details of the MSS determination process of Step S12 of FIG. 2 now is given. In Step S100, the determination device 32 may determine whether or not the current MSS value of the multifunctional device 10 stored in the memory 24 is greater than the reference MSS value of the PC 100 acquired during the TCP communication negotiation. When the current MSS value is greater than the reference MSS value (Step S100:YES), the determination device 32 may determine whether the reference MSS value is greater than 1460 bytes (Step S102).

When the reference MSS value is greater than 1460 bytes (Step S102:YES), the determination device 32 may change the setting value SV in the memory 24 from the current MSS value to the reference MSS value (Step S104). When the reference MSS value is less than or equal to 1460 bytes (Step S102:NO), the determination device 32 may maintain the current MSS value stored as the setting value SV in the memory 24 (Step S106), such that the current MSS value of the multifunctional device 10 may remain the same. When the multifunctional device 10 completes one of Steps S104 and S106, the MSS determination process of FIG. 3 may terminate.

When the current MSS value is less than or equal to the reference MSS value (Step S100:NO), the determination device 32 may determine whether the upper limit MSS value (i.e., the value obtained by subtracting 58 bytes from the storage capacity of the FIFO receive buffer FRB) of the multifunctional device 10 is less than the reference MSS value (Step S108).

When the upper limit MSS value is less than the reference MSS value (Step S108:YES), the determination device 32 may change the setting value SV in the memory 24 from the current MSS value to the upper limit MSS value (Step S110). When the upper limit MSS value is greater than or equal to the reference MSS value (Step S108:NO), the determination device 32 may change the setting value SV in the memory 24 from the current MSS value to the reference MSS value (Step S112). When the multifunctional device 10 completes one of Steps S110 and S112, the MSS determination process of FIG. 3 may terminate.

Descriptions of specific examples utilizing the MSS determination process of FIG. 3 now are given.

Case A1

In a case A1, as depicted in FIG. 4A, the administrator of the LAN 4 may set the MSS value (i.e., the reference MSS value) of each of the PCs 100 and 110 at a value (i.e., 4000 bytes), such that a jumbo frame communication may be executed. The multifunctional device 10 may be connected initially to this kind of LAN 4. The current MSS value and upper limit MSS value of the multifunctional device 10 may be 1460 bytes (e.g., the MSS value at the shipping stage) and 8000 bytes, respectively. For example, when a new multifunctional device 10 is connected initially to the LAN 4, the case A1 may occur.

During a TCP communication between the multifunctional device 10 and the PC 100, the reference MSS value acquisition device 30 of the multifunctional device 10 may acquire 4000 bytes as the reference MSS value of the PC 100. During the MSS determination process of FIG. 3, the determination device 32 may determine "No" in Step S100, may determine "No" in Step S108, and may change the setting value SV in the memory 24 from the current MSS value (i.e., 1460 bytes) to the reference MSS value (i.e., 4000 bytes) in Step S112. Consequently, the current MSS value of the multifunctional device 10 after the change may coincide with the MSS value of each of the PCs 100 and 110.

When preparing to transmit IP telephone voice data to the other PC 110 using a UDP communication with the PC 110, the transmission device 34 of the multifunctional device 10 may generate a transmission frame based on the current MSS value after the change (i.e., 4000 bytes) and may transmit the transmission frame to the PC 110. In particular, the transmission device 34 may generate a transmission frame for the application data having the maximum data size of 4012 bytes (4000 bytes+40 bytes−28 bytes). When the transmission device 34 generates a transmission frame comprising voice data having the maximum data size (i.e., 4012 bytes), the data size of the IP packet (i.e., the aggregate of the IP header, the UDP header, and the application data) comprised in the transmission frame may be 4040 bytes (4012 bytes+28 bytes).

The MTU value of the PC 110 may be 4040 bytes (4000 bytes+40 bytes). Consequently, even when a transmission frame comprising voice data having the maximum data size (i.e., 4012 bytes) is transmitted from the multifunctional device 10 to the PC 110, the PC 110 may determine that the data size (i.e., 4040 bytes) of the IP packet comprised in the transmission frame is less than or equal to the MTU value (i.e., 4040 bytes) of the PC 110, and the PC 110 may execute a process in accordance with the transmission frame.

In the case A1, when the multifunctional device 10 is connected to an existing LAN 4, the current MSS value of the multifunctional device 10 may be changed to the reference MSS value (i.e., 4000 bytes) of the PC 100 when the multifunctional device 10 and the PC 100 execute a TCP communication therebetween. Consequently, the multifunctional device 10 may determine an appropriate MSS value for the multifunctional device 10 in accordance with the LAN 4 (i.e., the MSS value currently employed in the LAN 4). When the multifunctional device 10 prepares to transmit a transmission frame to the PC 110 using a UDP communication, the multifunctional device 10 may generate a transmission frame based on the current MSS value (i.e., 4000 bytes) of the multifunctional device 10 after changing the current MSS value of the multifunctional device 10, as described above. Consequently, the multifunctional device 10 may execute UDP communication utilizing a jumbo frame when connected to the LAN 4 that enables jumbo frame communication. As a result, communication efficiency (e.g., communication speed) may increase. Moreover, because the transmission frame may be generated based on the MSS value (i.e., 4000 bytes) currently employed in the LAN 4, it may be possible to prevent the PC 110 from disregarding the transmission frame. Consequently, when the multifunctional device 10 prepares to transmit voice data to the PC 110 using a UDP communication, the multifunctional device 10 may generate a transmission frame based on an appropriate MSS value in accordance with the LAN 4, and the multifunctional device 10 may transmit the transmission frame to the PC 110.

Case A2

In a case A2, as depicted in FIG. 4B, the upper limit MSS value of the multifunctional device 10 may be 3000 bytes, rather than 8000 bytes as described in the case A1. The other MSS values may be the same as those described in the case A1. Unlike the case A1, however, the determination device 32 may determine "Yes" in Step S108 of FIG. 3, and the determination device 32 may change the setting value SV in the memory 24 from the current MSS value (i.e., 1460 bytes) to the upper limit MSS value (i.e., 3000 bytes) in Step S110.

When the multifunctional device 10 prepares to transmit voice data to the PC 110 using a UDP communication, the transmission device 34 of the multifunctional device 10 may generate a transmission frame based on the current MSS value after the change (i.e., 3000 bytes), and the transmission device 34 may transmit the transmission frame to the other PC 110. The PC 110 then may execute a process in accordance with the transmission frame.

In the case A2, when the multifunctional device 10 is connected to the LAN 4 that enables jumbo frame communication, the multifunctional device 10 may execute UDP communication utilizing a jumbo frame. Moreover, the multifunctional device 10 may not change the current MSS value to a reference MSS value greater than the upper limit MSS value. When the current MSS value of the multifunctional device 10 is greater than the upper limit MSS value, there may be a risk that the data size of a transmission frame generated based on the current MSS value may exceed the storage capacity of the FIFO transmit buffer FSB. In this case, the multifunctional device 10 and the PC 110 may not transmit the transmission frame therebetween because the FIFO transmit buffer FSB may not store the transmission frame. According to this embodiment, when the current MSS value of the multifunctional device 10 does not exceed the upper limit MSS value, it may be possible to prevent the situation in which the multifunctional device 10 and the PC 110 does not transmit the transmission frame therebetween.

Case A3

In a case A3, as depicted in FIG. 5A, the current MSS value of the multifunctional device 10 may be 5000 bytes, rather than 1460 bytes as described in the case A1. The other MSS values may be the same as those described in the case A1. For example, when the multifunctional device 10 previously was connected to a network (e.g., a network connected to a PC having an MSS value of 5000 bytes) different from the LAN 4, the current MSS value of the multifunctional device 10 may be 5000 bytes. The case A3 may occur when the multifunctional device 10 is connected initially to the LAN 4, after the multifunctional device 10 had been connected to the different network.

In the MSS determination process of FIG. 3, the determination device 32 may determine "Yes" in Step S100, may determine "Yes" in Step S102, and may change the setting value SV in the memory 24 from the current MSS value (i.e., 5000 bytes) to the reference MSS value (i.e., 4000 bytes) in Step S104. In the case A3, as in the case A1, the transmission device 34 may generate a UDP transmission frame based on the current MSS value after the change (i.e., 4000 bytes), and the transmission device 34 may transmit the transmission frame to the other PC 110. Consequently, the PC 110 may execute a process in accordance with the transmission frame.

In the case A3, the multifunctional device 10 may change the current MSS value (i.e., 5000 bytes) of the multifunctional device 10 to the reference MSS value (i.e., 4000 bytes) of the PC 100 when the current MSS value of the multifunctional device 10 is greater than the reference MSS value of the PC 100. Consequently, the multifunctional device 10 may generate a UDP transmission frame based on the MSS value (i.e., 4000 bytes) currently employed in the LAN 4. As a result, it may be possible to prevent the PC 110 from disregarding the UDP transmission frame transmitted from the multifunctional device 10.

Case A4

Figure 5B:
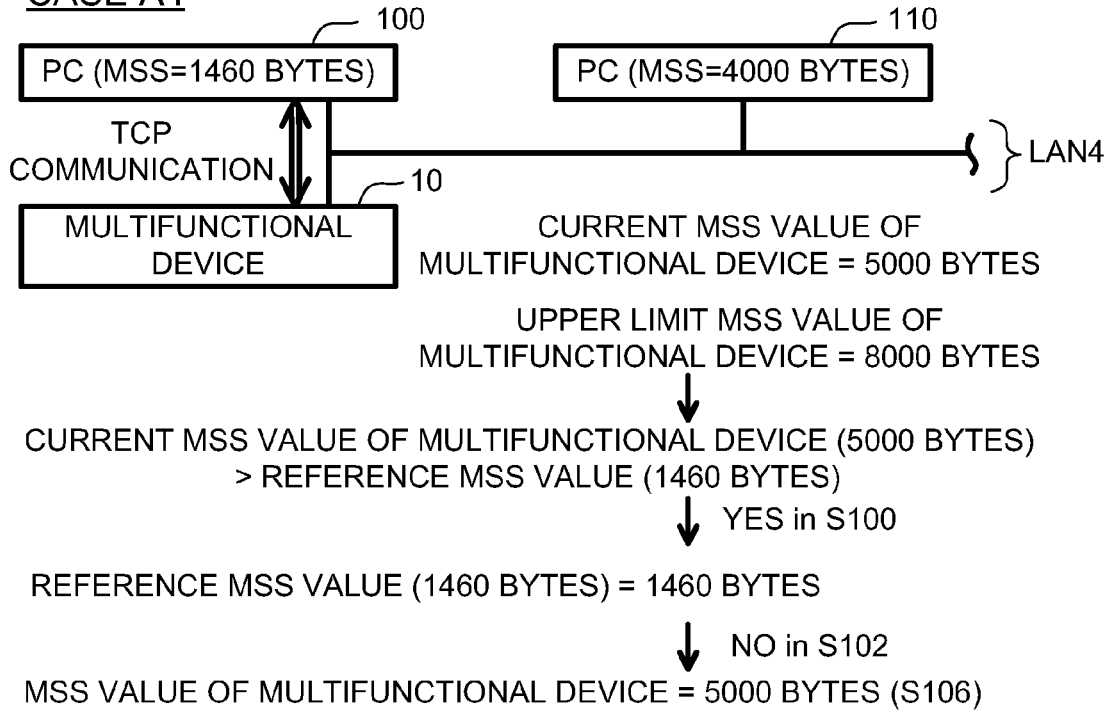
FIG. 5B depicts an exemplary case A4 of the process of FIG. 3.

In a case A4, as depicted in FIG. 5B, the MSS value (i.e., the reference MSS value) of the PC 100 may be 1460 bytes, rather than 4000 bytes as described in the case A3. The other MSS values may be the same as those described in the case A3. For example, the case A4 may occur when the multifunctional device 10 is connected to the LAN 4 before the administrator of the LAN 4 changes the MSS value of the PC 100 from a first value (i.e., 1460 bytes) utilized on the normal Ethernet network to a second value for executing a jumbo frame communication.

When the multifunctional device 10 and PC 100 execute a TCP communication therebetween, the reference MSS value acquisition device 30 of the multifunctional device 10 may acquire 1460 bytes as the reference MSS value of the PC 100. As a result, in the MSS determination process of FIG. 3, the determination device 32 may determine "Yes" in Step S100, may determine "No" in Step S102, and may maintain the current MSS value (i.e., 5000 bytes) in Step S106.

When the determination device 32 employs a method (hereafter referred to as a "comparison example method") in which the multifunctional device 10 may not maintain the current MSS value (i.e., 5000 bytes) and in which the multifunctional device 10 may change the reference MSS value (i.e., 1460 bytes), the following problem may occur. When the PC 110 and multifunctional device 10 execute a TCP communication therebetween and when the comparison example method also is employed in the PC 110, the PC 110 then may change the MSS value of the PC 110 from 4000 bytes to 1460 bytes after the multifunctional device 10 changes the current MSS value of the multifunctional device 10 to 1460 bytes. As a result, all devices connected to the LAN 4 may change their respective MSS values to the 1460 bytes utilized on the normal Ethernet network. Therefore, the administrator of the LAN 4 may not construct a network in which a jumbo frame communication may be executed, even when the administrator of the LAN 4 wishes to do so.

To combat this problem, a method in which the multifunctional device 10 may maintain the current MSS value (i.e., 5000 bytes) may be employed in the case A4. In this case, it may be possible to prevent the devices connected to the LAN 4 from changing their respective MSS values the 1460 bytes utilized on the normal Ethernet network, and it may be possible to construct a network in which a jumbo frame communication may be executed.

Case A5

Figure 6:
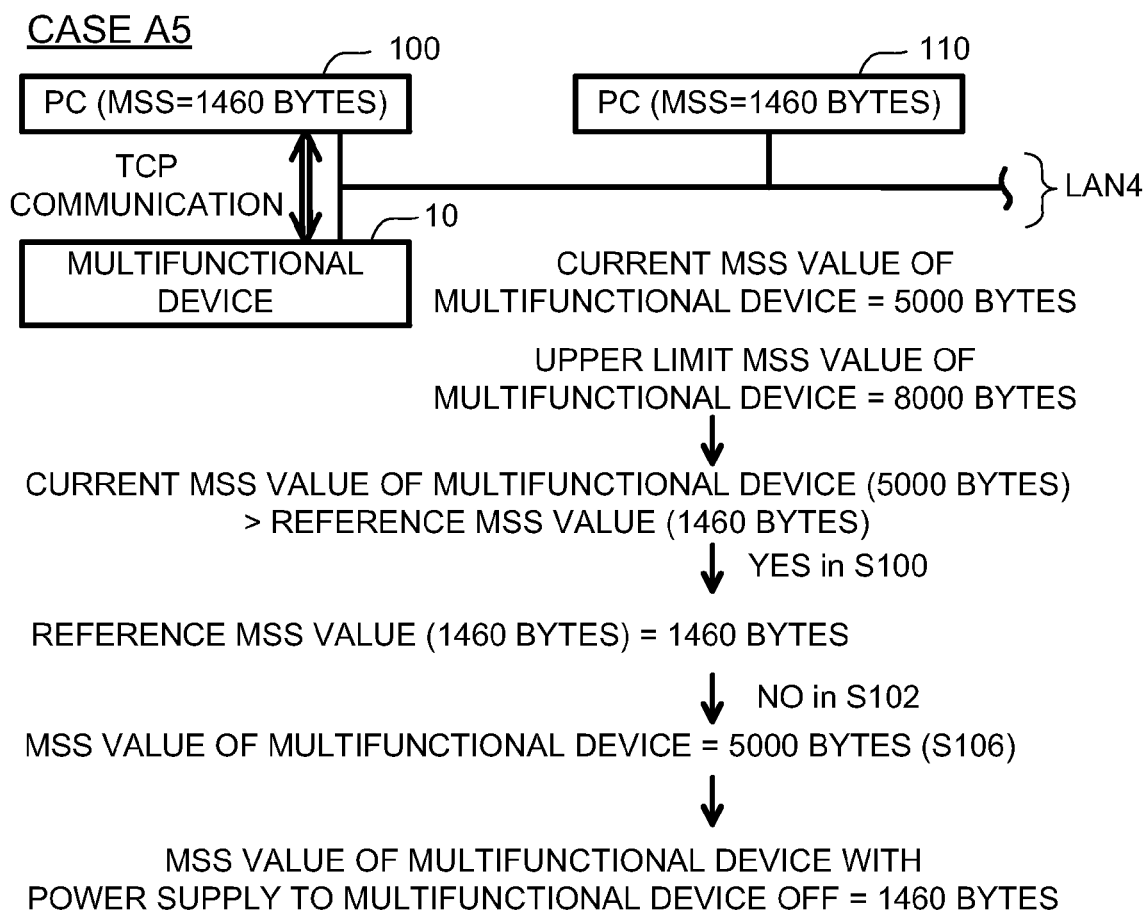
FIG. 6 depicts an exemplary case A5 of the process of FIG. 3.

In a case A5, as depicted in FIG. 6, the MSS value of the PC 110 is 1460 bytes, rather than 4000 bytes as described in the case A4. The other MSS values may be the same as those described in the case A4 (e.g., the MSS value of the PC 100 also may be 1460 bytes). For example, when the administrator of the LAN 4 wishes to construct a normal Ethernet network, the administrator may set the MSS values of the PCs 100 and 110 connected to the LAN 4 at 1460 bytes. Similar to the case A3, the case A5 may occur when the multifunctional device 10 is connected initially to the LAN 4 after the multifunctional device 10 had been connected to a different network.

When the multifunctional device 10 connects to the LAN 4 configured to be a normal Ethernet network, the multifunctional device 10 may maintain the current MSS value (i.e., 5000 bytes), as described in the case A4. When the multifunctional device 10 is preparing to transmit voice data to the PC 110 using a UDP communication, the multifunctional device 10 may generate a UDP transmission frame based on the current MSS value (i.e., 5000 bytes), however, the PC 110 may disregard the UDP transmission frame transmitted from the multifunctional device 10. Consequently, it may not be possible for the multifunctional device 10 and the PC 110 to execute a UDP communication therebetween. Similarly, it may not be possible for the multifunctional device 10 and the PC 100 to execute a UDP communication therebetween.

To avoid this problem, when the power supply to the multifunctional device 10 is in the off state, the determination device 32 of the multifunctional device 10 may change the setting value SV in the memory 24 from the current MSS value (i.e., 5000 bytes) to a predetermined 1460 bytes. The determination device 32 may change the setting value SV in the memory 24 as described above at a time between a time when an operation for turning off the power supply to the multifunctional device 10 initiates and a time when the power supply to the multifunctional device 10 actually turns off. Alternatively or additionally, the determination device 32 may change the setting value SV in the memory 24, as described above, at a time when the power supply to the multifunctional device 10 turns on.

The transmission device 34 of the multifunctional device 10 may generate a UDP transmission frame based on the current MSS value after the above-described change to 1460 bytes and after the power supply to the multifunctional device 10 is turned on again. Consequently, the PC 110 may execute a process in accordance with the transmission frame without disregarding the transmission frame.

In the case A5, the administrator of the LAN 4 readily may recreate a normal Ethernet network by turning off the power supply to the multifunctional device 10.

UDP Communication from PC 100 to Multifunctional Device 10 of FIG. 2

After the multifunctional device 10 connects initially to the LAN 4, for example, the PC 100 may transmit an SNMP request (e.g., a request for acquiring the status of the multifunctional device 10) to the multifunctional device 10 using a UDP communication. Unlike a TCP communication, however, such UDP communication may occur without executing negotiation. Consequently, the PC 100 may not know the current MSS value of the multifunctional device 10, and the multifunctional device 10 may not know the reference MSS value of the PC 100.

The PC 100 may compute the MTU value of the PC 100 by adding 40 bytes (20 bytes+20 bytes) to the reference MSS value of the PC 100. The PC 100 may compute the maximum data size (hereafter referred to as the "specific maximum data size") of the application data to be comprised in a UDP frame by subtracting 28 bytes (20 bytes+8 bytes) from the MTU value of the PC 100. The PC 100 may generate a UDP frame F4 comprising application data (e.g., an SNMP request) of a size less than or equal to the specific maximum data size, and the PC 100 may transmit the frame F4 to the multifunctional device 10.

The UDP header in the frame F4 may comprise a data length value. As depicted in FIG. 1, a data length value may be the sum of the data size of the UDP header in the frame F4 (i.e., 8 bytes) and the data size of the application data in the frame F4. Consequently, by adding 20 bytes to the data length value, the data size of the IP packet in the frame F4 may be calculated.

When the data size of the application data in the frame F4 coincides with the specific maximum data size, a computed value calculated by subtracting 40 bytes from the data size of the IP packet in the frame F4 may coincide with the reference MSS value of the PC 100. Nevertheless, the data size of the application data in the frame F4 may not coincide with the specific maximum data size. For example, when the amount of application data to be transmitted from the PC 100 to the multifunctional device 10 is relatively small, the data size of the application data in the frame F4 may be less than the specific maximum data size. In this case, the computed value calculated by subtracting 40 bytes from the data size of the IP packet in the frame F4 may be less than the reference MSS value of the PC 100. Thus, the computed value calculated from the data length value comprised in the UDP header in the frame F4 may be a candidate for the reference MSS value of the PC 100, and the computed value may not coincide inevitably with the reference MSS value of the PC 100. Hereafter, the computed value calculated from the data length value may be referred to as a "candidate MSS value".

The data length acquisition device 36 of the multifunctional device 10, as depicted in FIG. 1, may acquire the data length value comprised in the UDP header by analyzing the UDP header in the received frame F4 transmitted from the PC 100. The control device 20 of the multifunctional device 10 may compute the data size of the IP packet in the received frame F4 by adding 20 bytes to the data length value. Furthermore, the control device 20 may compute the MTU value of the multifunctional device 10 by adding 40 bytes to the current MSS value of the multifunctional device 10. The control device 20 may compare the data size of the IP packet in the received frame F4 and the MTU value of the multifunctional device 10. When the data size of the IP packet in the received frame F4 is greater than the MTU value of the multifunctional device 10, the control device 20 may disregard the received frame F4. When the data size of the IP packet in the received frame F4 is less than or equal to the MTU value of the multifunctional device 10, the control device 20 may execute a process (e.g., a process of generating an SNMP response) in accordance with the received frame F4.

In Step S20, the determination device 32 may determine whether the current MSS value of the multifunctional device 10 is established or fixed. Step S20 may be the same as Step S10, except that Step S20 may correspond to the UDP communication session. When the current MSS value of the multifunctional device 10 has not been established (Step S20: NO), the determination device 32 may execute the MSS determination process of Step S22. When the multifunctional device 10 prepares to transmit the IP telephone voice data to the other PC 110 after executing the MSS determination process of Step S22, the transmission device 34 may generate a transmission frame F5 comprising the voice data (Step S24). The transmission device 34 may transmit the transmission frame F5 to the PC 110 using a UDP communication. Processes for the generation and transmission of the transmission frame F5 may be similar to the processes for the generation and transmission of the transmission frame F3.

Figure 7:
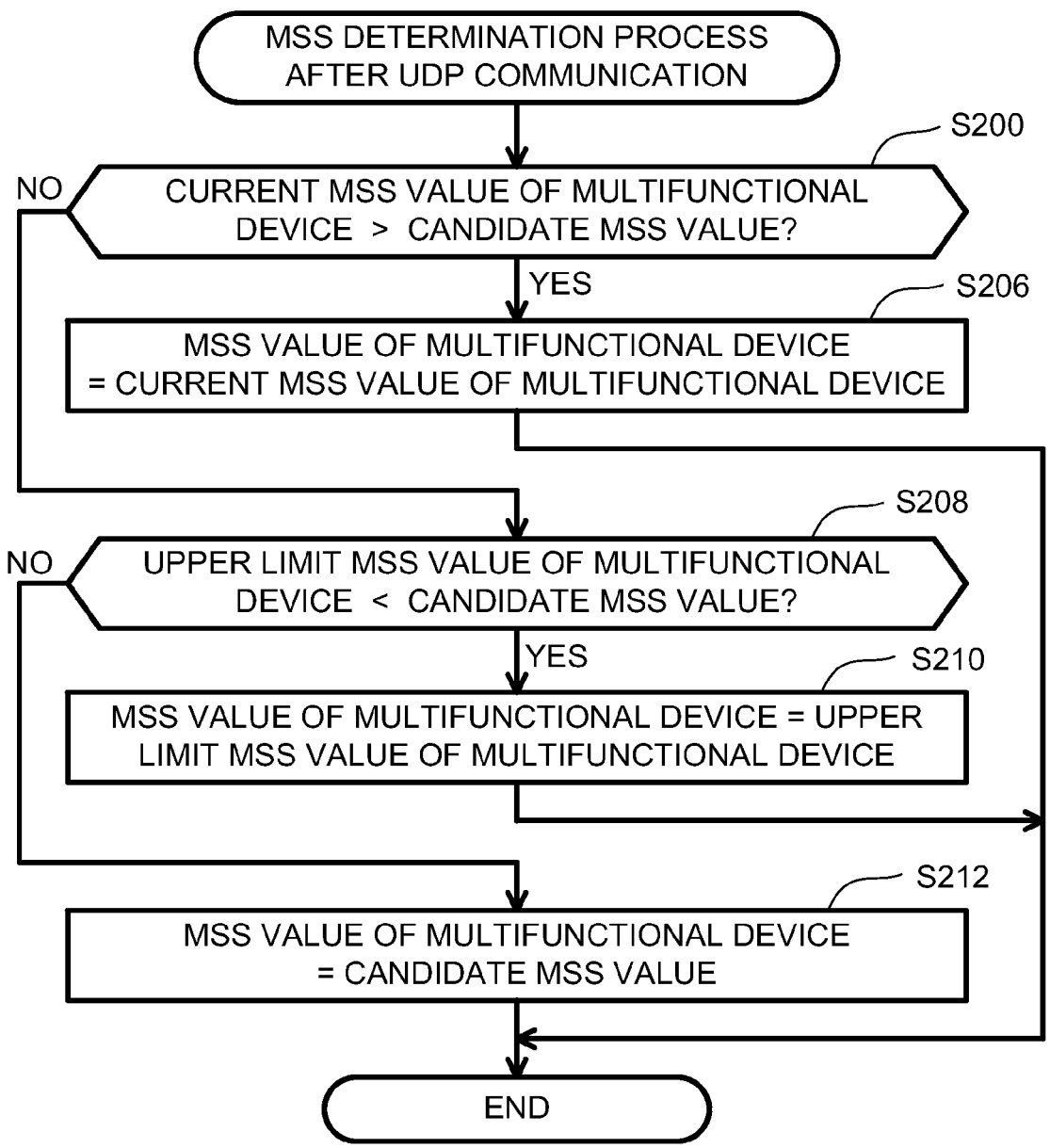
FIG. 7 depicts a flowchart of an MSS determination process after user datagram protocol ("UDP") communication.

MSS Determination Process after UDP Communication of FIG. 7

Referring to FIG. 7, a description of the details of the MSS determination process of Step S22, as depicted in FIG. 2, is given. In Step S200, the determination device 32 may determine whether the current MSS value of the multifunctional device 10 is greater than the candidate MSS value of the PC 100 obtained from the data length value comprised in the UDP header in the received frame F4. When the current MSS value is greater than the candidate MSS value (Step S200: YES), the determination device 32 may maintain the current MSS value stored as the setting value SV in the memory 24 (Step S206). When the multifunctional device 10 completes Step S206, the MSS determination process depicted in FIG. 7 may terminate.

When the current MSS value is less than or equal to the candidate MSS value (Step S200:NO), the determination device 32 may determine whether the upper limit MSS value of the multifunctional device 10 is less than the candidate MSS value (Step S208). When the upper limit MSS value is less than the candidate MSS value (Step S208:YES), the determination device 32 may change the setting value SV in the memory 24 from the current MSS value to the upper limit MSS value (Step S210). When the upper limit MSS value of the multifunctional device 10 is greater than or equal to the candidate MSS value (Step S208:NO), the determination device 32 may change the setting value SV in the memory 24 from the current MSS value to the candidate MSS value (Step S212). After the multifunctional device 10 completes one of Steps S210 and S212, the MSS determination process of FIG. 7 may terminate.

Descriptions of specific examples utilizing the MSS determination process of FIG. 7 now are given.

Case B1-1

In a case B1-1, as depicted in FIG. 8A, which is similar to the case A1 depicted in FIG. 4A, the MSS value of each of the PCs 100 and 110 may be 4000 bytes, and the current MSS value and upper limit MSS value of the multifunctional device 10 may be 1460 bytes and 8000 bytes, respectively.

During a UDP communication between the PC 100 and the multifunctional device 10, the PC 100 may transmit the frame F4 comprising application data having the specific maximum data size. In this case, the candidate MSS value of the PC 100 obtained from the data length value in the frame F4 may coincide with the reference MSS value (i.e., 4000 bytes) of the PC 100. During the MSS determination process of FIG. 7, the determination device 32 may determine "No" in Step S200, may determine "No" in Step S208, and may change the setting value SV in the memory 24 from the current MSS value (i.e., 1460 bytes) to the candidate MSS value (i.e., 4000 bytes) in Step S212. Consequently, after the change, the current MSS value of the multifunctional device 10 may coincide with the MSS values of each of the PCs 100 and 110, and the same advantages described in the case A1 may be obtained.

In the case A1, as depicted in FIG. 4A, and the case B1-1, as depicted in FIG. 8A, the LAN 4 may have the same configuration. When the multifunctional device 10 and the PC 100 execute a TCP communication therebetween, prior to executing a UDP communication therebetween; the determination device 32 may set the reference MSS value (i.e., 4000 bytes) acquired during negotiation with the PC 100 as the MSS value of the multifunctional device 10 after the multifunctional device 10 is connected initially to the LAN 4 in the case B1-1. When the multifunctional device 10 and the PC 100 execute a UDP communication therebetween, prior to executing a TCP communication therebetween; the determination device 32 may set the candidate MSS value (i.e., 4000 bytes) of the PC 100 obtained from the data length value in the frame received from the PC 100 as the MSS value of the multifunctional device 10 after the multifunctional device 10 is connected initially to the LAN 4 in the case B1-1. In the case B1-1, the candidate MSS value (i.e., 4000 bytes) may be the same as the reference MSS value (i.e., 4000 bytes). Consequently, in both the case A1, as depicted in FIG. 4A, and the case B1-1, as depicted in FIG. 8A, the determination device 32 may set the same value (i.e., 4000 bytes) as the MSS value of the multifunctional device 10.

Case B1-2

In a case B1-2, as depicted in FIG. 8B, the PC 100 transmits the frame F4 comprising application data having a data size less than the specific maximum data size during a UDP communication from the PC 100 to the multifunctional device 10. By contrast, the PC 100 may transmit the frame F4 having a data size equal to the specific maximum data size in the case B1-1. The candidate MSS value of the PC 100 obtained from the data length value in the frame F4 may be 3000 bytes, which may be less than the reference MSS value (i.e., 4000 bytes) of the PC 100.

In this case, similar to the case B1-1, the determination device 32 may determine "No" in Step S200, may determine "No" in Step S208, and may change the setting value SV in the memory 24 from the current MSS value (i.e., 1460 bytes) to the candidate MSS value (i.e., 3000 bytes) in Step S212. After the change, the current MSS value of the multifunctional device 10 may be less than the MSS values of the PCs 100 and 110; however, the same advantages described in the case A1 may be obtained.

Case B-2

Figure 9A:
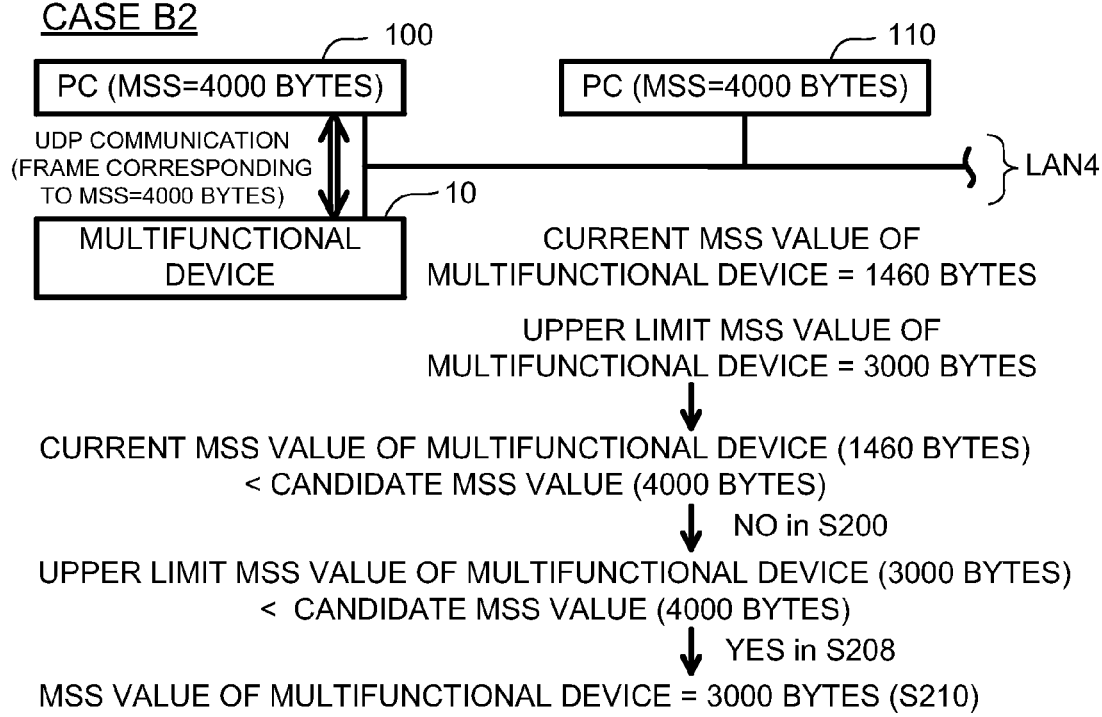
FIG. 9A depicts an exemplary case B2 of the process of FIG. 7.

In a case B2, as depicted in FIG. 9A, the upper limit MSS value of the multifunctional device 10 is 3000 bytes, rather than 8000 bytes as described in the case B1-1. In contrast to the case B1-1, the determination device 32 may determine "Yes" in Step S208 of FIG. 7 and may change the setting value SV in the memory 24 from the current MSS value (i.e., 1460 bytes) to the upper limit MSS value (i.e., 3000 bytes) in Step S210. In this case, the same advantages as in the case A2 may be obtained.

Case B-3

Figure 9B:
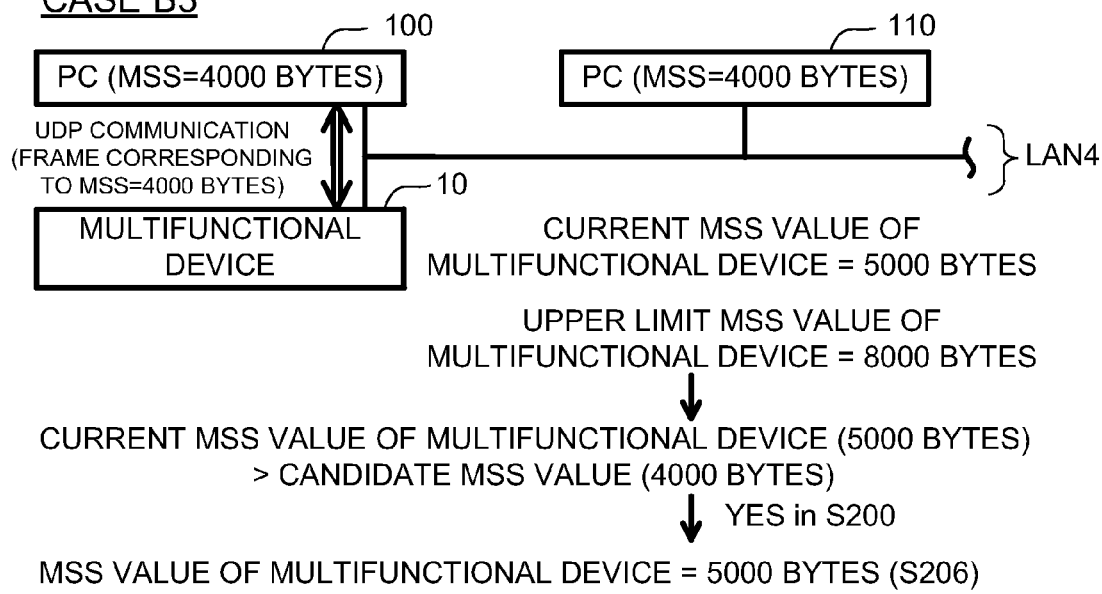
FIG. 9B depicts an exemplary case B3 of the process of FIG. 7.

In a case B3, as depicted in FIG. 9B, the current MSS value of the multifunctional device 10 is 5000 bytes, rather than 1460 bytes as described in the case B1-1. During the MSS determination process depicted in FIG. 7, the determination device 32 may determine "Yes" in Step S200 and may maintain the current MSS value (i.e., 5000 bytes) stored as the setting value SV in the memory 24 (Step S206).

As described above, the candidate MSS value of the PC 100 may not coincide with the reference MSS value of the PC 100 in some cases. Accordingly, there may be a possibility that the candidate MSS value is less than the reference MSS value. When Step S206 employs a method in which the current MSS value of the multifunctional device 10 is changed to the candidate MSS value of the PC 100, the current MSS value may be be reduced to less than the reference MSS value, such that the current MSS value may change to a small value which the administrator of the LAN 4 may not desire. Consequently, in the embodiment, it may be possible to prevent changing the current MSS value to a small value which the administrator may not desire by employing a method in S206 in which the current MSS value of the multifunctional device 10 may be maintained.

Correspondence Relationship

The multifunctional device 10, PC 100, and PC 110 may be examples of a "communication device," a "first device," and a "second device," respectively. The MSS value of the multifunctional device 10 (i.e., the MSS value stored as the setting value SV in the memory 24) may be an example of a "specific value." The voice data transmitted in the frames F3 and F5, as depicted in FIG. 2, may be examples of "application data."

The invention may not be limited to the above-described embodiments, but may be implemented in various forms with various modifications without departing from the scope and spirit of the invention. Although not a comprehensive listing of modifications, several exemplary modifications are described hereafter.

Modification 1

In each of the above-described embodiments, the MSS value of the multifunctional device 10 may be stored as the setting value SV in the memory 24. Consequently, the determination device 32 may determine the MSS value of the multifunctional device 10 by utilizing one or more of the reference MSS value of the PC 100 and the data length value in the received frame F4 received from the PC 100. Alternatively, a configuration may be employed in which the memory 24 may store the MTU value of the multifunctional device 10 as the setting value SV without storing the MSS value of the multifunctional device 10. In this case, the determination device 32 may determine the MTU value of the multifunctional device 10 utilizing the reference MSS value of the PC 100 or the data length value.

Generally, the "specific value" may be a value which is available for determining the MSS value or MTU value of the communication device. The specific value may be the MSS value of the communication device, as in the above-described embodiments, or the specific value may be the MTU value of the communication device, as described herein. For example, the MSS value of the communication device may be determined, such that the current MSS value of the communication device may be changed to the reference MSS value of the first device as described above, and the MTU value of the communication device may be determined, such that the current MSS value of the communication device may be changed to the reference MSS value of the first device as described in modification 1.

Modification 2

A configuration also may be employed in which the memory 24 may store both the MSS value of the multifunctional device 10 and the MTU value of the multifunctional device 10 as setting values SV. In this case, the determination device 32 may set the MSS value of the multifunctional device 10 as the "specific value," or the determination device 32 may set the MTU value of the multifunctional device 10 as the "specific value."

Modification 3

In Step S100, as depicted in FIG. 3, the determination device 32 may compare the current MSS value of the multifunctional device 10 and the reference MSS value of the PC 100. Nevertheless, in Step S100, the determination device 32 may compare the MTU value of the multifunctional device 10 (i.e., the current MSS value+40 bytes) and the MTU value of the PC 100 (i.e. the reference MSS value+40 bytes). When one of the MTU value and MSS value is determined, the other value may be determined unambiguously. Consequently, in each determination process depicted in FIGS. 3 and 7 (e.g., S100, S102, S108, S200, and S208), the MSS values may be compared, as in the above-described embodiments, or the MTU values may be compared, as described herein.

Modification 4

In the above embodiments, as depicted in FIG. 3, the determination device 32 may determine whether to change the MSS value of the multifunctional device 10 from the current MSS value to the reference MSS value in accordance with the relationship between the reference MSS value of the PC 100 and another value (e.g., the current MSS value of the multifunctional device 10, 1460 bytes, the upper limit MSS value, or the like) (Steps S100, S102, and S108). Nevertheless, the determination device 32 may change the MSS value of the multifunctional device 10 from the current MSS value to the reference MSS value, regardless of the relationship between the reference MSS value of the PC 100 and the other value. The determination device 32 may change the MSS value of the multifunctional device 10 from the current MSS value to the reference MSS value in the case of "Yes" in Step S10, as depicted in FIG. 2. Generally, when determining the specific value, such that the current MSS value of the communication device may be changed to the reference MSS value of the first device, the determination device 32 may consider the relationship between the reference MSS value and the other value, or the determination device 32 may disregard the relationship between the reference MSS value and the other value. Similarly, when determining the specific value, such that the current MSS value of the communication device may be changed to the candidate MSS value of the first device, the determination device 32 may consider the relationship between the candidate MSS value and the other value or may disregard the relationship between the candidate MSS value and the other value.

Modification 5

In the above-described embodiments, "voice data" may be employed as the application data transmitted from the multifunctional device 10 to the PC 110 using a UDP communication. Alternatively or additionally, another kind of data (e.g., video data) may be employed as the application data. Generally, the "application data" may be any type of data that may be transmitted from the communication device to the second device using a UDP communication.

Modification 6

In the above-described embodiments, the multifunctional device may function as a communication device; however, other devices, such as a printer, a scanner, a fax machine, a copier, a telephone, a PC, a server, a cell phone, or a PDA, may function as the communication device. In the above-described embodiments, PCs may function as a first device or a second device; however, other devices, such as printers, scanners, fax machines, copiers, telephones, multifunctional devices, servers, cell phones, or PDAs, may function as one or more of the first device and the second device.

While the invention has been described in connection with various exemplary structures and illustrative embodiments, it will be understood by those skilled in the art that other variations and modifications of the structures, configurations, and embodiments described above may be made without departing from the scope of the invention. For example, this application may comprise any possible combination of the various features disclosed herein, and the particular features presented in the claims and disclosed above may be combined with each other in other ways within the scope of the application, such that the application should be recognized as also directed to other embodiments comprising any other possible combinations. Other structures, configurations, and embodiments will be apparent to those skilled in the art from a consideration of the specification or practice of the invention disclosed herein. It is intended that the specification and the described examples are illustrative with the true scope of the invention being defined by the following claims.

What is claimed is:

1. A communication device comprising:
   a processor; and
   a memory configured to store computer-readable instructions therein,
   wherein the computer-readable instructions instruct the processor to operate as:
   a reference maximum segment size ("MSS") value acquisition device configured to acquire a reference MSS value from a first device by executing a transmission control protocol communication with the first device;
   a transmission device configured to generate a transmission frame and to transmit the transmission frame to a second device when executing a user datagram protocol ("UDP") communication with the second device,
   wherein the reference MSS value is a value of an MSS of the first device,
   wherein a size of the transmission frame is based on a specific value determined utilizing the reference MSS value of the first device; and
   a determination device configured to determine the specific value by utilizing the reference MSS value of the first device, such that a current MSS value of the communication device changes to an upper limit MSS value of the communication device when the current MSS value is less than or equal to the reference MSS value of the first device and the upper limit MSS value is less than the reference MSS value of the first device,
wherein the current MSS value is a value of an MSS of the communication device, and
wherein the upper limit MSS value is a value of an upper limit of the MSS of the communication device.

2. The communication device according to claim 1, wherein the determination device is further configured to determine the specific value by utilizing the reference MSS value of the first device, such that the current MSS value of the communication device changes to the reference MSS value of the first device when the current MSS value satisfies a predetermined condition.

3. The communication device according to claim 2, wherein the determination device changes the current MSS value as the specific value to the reference MSS value of the first device.

4. The communication device according to claim 2, wherein the computer-readable instructions further instruct the processor to operate as:
a data length acquisition device configured to acquire a data length value comprised in a UDP header of a received frame received by executing a UDP communication with the first device,
wherein the determination device is further configured to determine the specific value utilizing the data length value when the data length acquisition device acquires the data length value.

5. The communication device according to claim 1, wherein the determination device is further configured to determine the specific value by utilizing the reference MSS value of the first device, such that
the current MSS value of the communication device changes to the reference MSS value of the first device when the current MSS value is less than or equal to the reference MSS value of the first device, and
the current MSS value of the communication device is maintained when the current MSS value is greater than the reference MSS value of the first device.

6. The communication device according to claim 1, wherein the determination device is further configured to determine the specific value by utilizing the reference MSS value of the first device, such that
the current MSS value of the communication device changes to the reference MSS value of the first device when the current MSS value is greater than the reference MSS value of the first device and the reference MSS value of the first device is greater than a predetermined value, and
the current MSS value of the communication device is maintained when the current MSS value is greater than the reference MSS value of the first device and the reference MSS value of the first device is less than or equal to the predetermined value.

7. The communication device according to claim 6, wherein the predetermined value is 1460 bytes.

8. The communication device according to claim 1,
wherein the transmission frame comprises application data,
wherein the transmission device is configured to determine a maximum data size of the application data based on the specific value, and
wherein the transmission device is configured to generate the transmission frame, such that the data size of the application data comprised in the transmission frame is less than or equal to the determined maximum data size.

9. A communication device comprising:
a processor; and
a memory configured to store computer-readable instructions therein,
wherein the computer-readable instructions instruct the processor to operate as:
a data length acquisition device configured to acquire a data length value comprised in a user datagram protocol ("UDP") header of a received frame received by executing a UDP communication with a first device;
a transmission device configured to generate a transmission frame and to transmit the transmission frame to a second device when executing a UDP communication with the second device,
wherein a size of the transmission frame is based on a specific value determined utilizing the data length value; and
a determination device configured to determine the specific value by utilizing the data length value, such that
a current maximum segment size ("MSS") value of the communication device changes to an upper limit MSS value of the communication device when the current MSS value of the communication device is less than or equal to the candidate MSS value of the first device and the upper limit MSS value is less than a candidate MSS value of the first device, and
the current MSS value of the communication device changes to the candidate MSS value of the first device when the current MSS value is less than or equal to the candidate MSS value of the first device and the upper limit MSS value of the communication device is greater than or equal to the candidate MSS value of the first device,
wherein the current MSS value is a value of an MSS of the communication device,
wherein the upper limit MSS value is a value of an upper limit of an MSS of the communication device, and
wherein the candidate MSS value is a candidate for a value of an MSS of the first device obtained from the data length value.

10. The communication device according to claim 9, wherein the determination device is further configured to determine the specific value by utilizing the data length value, such that a current MSS value of the communication device changes to a candidate MSS value when the current MSS value satisfies a predetermined condition.

11. The communication device according to claim 9, wherein the determination device is further configured to determine the specific value by utilizing the data length value, such that
a current MSS value of the communication device changes to a candidate MSS value of the first device when the current MSS value is less than or equal to the candidate MSS value of the first device, and
the current MSS value of the communication device is maintained when the current MSS value is greater than the candidate MSS value of the first device.

12. The communication device according to claim 9,
wherein the transmission frame comprises application data,
wherein the transmission device is configured to determine a maximum data size of the application data to be comprised in the transmission frame based on the specific value, and wherein the transmission device is configured to generate the transmission frame such that the data size of the application data comprised in the transmission frame is less than or equal to the determined maximum data size.

13. A non-transitory, computer-readable storage medium comprising computer-readable instructions for a processor of a communication device, the computer-readable instructions instructing the processor to perform the steps of:

acquiring a reference maximum segment size ("MSS") value from a first device by executing a transmission control protocol communication with the first device, wherein the reference MSS value is a value of an MSS of the first device;

determining a size of a transmission frame based on a specific value determined utilizing the reference MSS value of the first device; and generating the transmission frame based on the size and transmitting the transmission frame to a second device when executing a user datagram protocol communication with the second device, wherein determining the size of the transmission frame based on the specific value determined utilizing the reference MSS value of the first device comprises determining the specific value by utilizing the reference MSS value of the first device, such that a current MSS value of the communication device changes to an upper limit MSS value of the communication device when the current MSS value is less than or equal to the reference MSS value of the first device and the upper limit MSS value is less than the reference MSS value of the first device, wherein the current MSS value is a value of an MSS of the communication device, and wherein the upper limit MSS value is a value of an upper limit of the MSS of the communication device.

14. A non-transitory, computer-readable storage medium comprising computer-readable instructions for a processor of a communication device, the computer-readable instructions instructing the processor to perform the steps of:

acquiring a data length value comprised in a user datagram protocol ("UDP") header of a received frame received by executing a UDP communication with a first device;

determining a size of a transmission frame based on a specific value determined utilizing the data length value; and generating the transmission frame based on the size and transmitting the transmission frame to a second device when executing a UDP communication with the second device wherein determining the size of the transmission frame based on the specific value determined utilizing the data length value comprises determining the specific value by utilizing the data length value, such that a current maximum segment size ("MSS") value of the communication device changes to an upper limit MSS value of the communication device when the current MSS value of the communication device is less than or equal to the candidate MSS value of the first device and the upper limit MSS value is less than a candidate MSS value of the first device, and the current MSS value of the communication device changes to the candidate MSS value of the first device when the current MSS value is less than or equal to the candidate MSS value of the first device and the upper limit MSS value of the communication device is greater than or equal to the candidate MSS value of the first device, wherein the current MSS value is a value of an MSS of the communication device, wherein the upper limit MSS value is a value of an upper limit of an MSS of the communication device, and wherein the candidate MSS value is a candidate for a value of an MSS of the first device obtained from the data length value.

15. A communication device comprising:

a reference maximum segment size ("MSS") value acquisition device configured to acquire a reference MSS value from a first device by executing a transmission control protocol communication with the first device;

a transmitter configured to generate a transmission frame and to transmit the transmission frame to a second device when executing a user datagram protocol communication with the second device, wherein the reference MSS value is a value of an MSS of the first device, and wherein a size of the transmission frame is based on a specific value determined utilizing the reference MSS value of the first device; and a determination device configured to determine the specific value by utilizing the reference MSS value of the first device, such that a current MSS value of the communication device changes to an upper limit MSS value of the communication device when the current MSS value is less than or equal to the reference MSS value of the first device and the upper limit MSS value is less than the reference MSS value of the first device, wherein the current MSS value is a value of an MSS of the communication device, and wherein the upper limit MSS value is a value of an upper limit of the MSS of the communication device.

16. A communication device comprising:

a data length acquisition device configured to acquire a data length value comprised in a user datagram protocol ("UDP") header of a received frame received by executing a UDP communication with a first device;

a transmitter configured to generate a transmission frame and to transmit the transmission frame to a second device when executing a UDP communication with the second device, wherein a size of the transmission frame is based on a specific value determined utilizing the data length value; and a determination device configured to determine the specific value by utilizing the data length value, such that a current maximum segment size ("MSS") value of the communication device changes to an upper limit MSS value of the communication device when the current MSS value of the communication device is less than or equal to the candidate MSS value of the first device and the upper limit MSS value is less than a candidate MSS value of the first device, and the current MSS value of the communication device changes to the candidate MSS value of the first device when the current MSS value is less than or equal to the candidate MSS value of the first device and the upper limit MSS value of the communication device is greater than or equal to the candidate MSS value of the first device, wherein the current MSS value is a value of an MSS of the communication device, wherein the upper limit MSS value is a value of an upper limit of an MSS of the communication device, and wherein the candidate MSS value is a candidate for a value of an MSS of the first device obtained from the data length value.

17. The communication device according to claim 1, wherein the determination device is further configured to determine the specific value by utilizing the reference MSS value of the first device, such that the current MSS value of the communication device changes to the reference MSS value of the first device when the current MSS value is less than or equal to the reference MSS value of the first device and the upper limit MSS value is greater than the reference MSS value of the first device.

* * * * *